July 31, 1956     E. M. HADLEY, JR     2,756,461
PLASTICS EXTRUSION
Filed Dec. 19, 1951
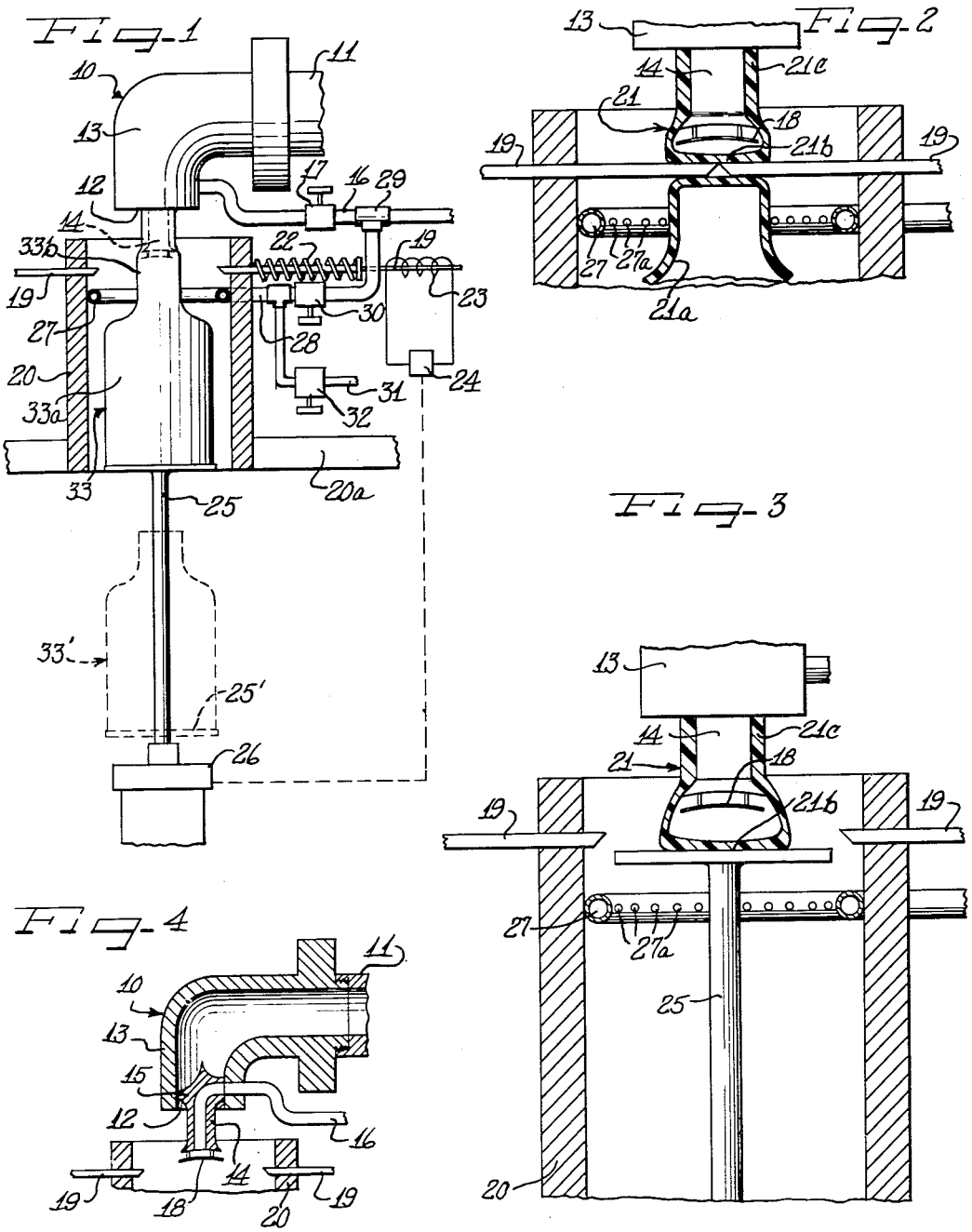
Inventor
Edwin M. Hadley Jr.

United States Patent Office 2,756,461
Patented July 31, 1956

2,756,461

PLASTICS EXTRUSION METHOD

Edwin M. Hadley, Jr., Highland Park, Ill., assignor to Castings Patent Company, Chicago, Ill., a copartnership Application December 19, 1951, Serial No. 262,431

2 Claims. (Cl. 18—55)

The present invention relates to an improved method for the extrusion of plastics, and more particularly, to an improved method whereby plastic closures may be fabricated.

In general, plastic extrusion is understood to comprise the compacting of a plastifiable material and the forcing of the same outwardly through a suitable orifice in more or less, continuous fashion. The compacting and forcing means currently used consist essentially of a continuous screw conveyor means.

The plastifiable materials ordinarily used are suitable synthetic resin materials. Such materials may be pre-softened by combination with a substantial amount of a suitable solvent, as in the case of the so-called "wet" extrusion; or such materials may contain only minor proportions of modifying and lubricating agents, as in the case of the so-called "dry" extrusion. In the dry extrusion operation, as it is generally used in the plastics industry, a screw device is used for advancing the plastic material through zones of controlled temperature. The rotating action of the screw in its closely fitting sleeve causes mixing, smearing and frictional heating, and it forces the plastic through a suitable orifice to define its ultimate shape. For many years, it has been assumed that an extruded product must necessarily have the same cross-section at all points along its lengthwise dimension.

Plastic closures have been prepared by means of a process generally referred to as "blow molding," which resembles to some extent the old art of glass blowing. Two basic processes are used, namely, the direct and the indirect processes. The indirect process usually consists in preparing a parison of a semi-plastic material in a stock shape substantially that of the finished shape desired, and then reheating the stock and blowing it against a female mold. The direct method usually consists in heating a suitable material, forming it into a parison approximating the finished shape desired, and then blowing it against a female mold.

It has been suggested that in applying the extrusion art to the blow molding art that, for final shaping, the blowing should be done immediately after the parison is formed, while the plastic material is still in a warm and workable condition. The cycle is rapid, for as soon as the tube is extruded from the orifice and while it is still connected with the extruder, a female blow mold closes about the tube. Air pressure from an air tube within the cross head of the extruding machine is then applied to stretch the plastic into close contact with the cold blow mold. As soon as the plastic film comes into contact with the cold surface of the female blow mold, the plastic sets up. A splitting knife severs the extrusion from the extruder. Such a procedure requires rather complicated machinery, and can be used only with certain plastics.

It is, therefore, an important object of the instant invention to provide an improved plastic extrusion method.

It is a further object of the instant invention to provide an improved method for the preparation of plastic closures, employing an extrusion method.

It is another important object of the instant invention to provide an improved method for effecting variations in the cross-section of an extruded plastic along its lengthwise dimension.

It is still a further important object of the instant invention to provide an improved method for forming plastic closures at the mouth of an extruder orifice without the use of negative blow molds.

It is still another object of the instant invention to provide an improved method for effecting variations in the diameter of an extruded tube of plastic just prior to the setting of the plastic in the extruding tube.

It is yet another object of the instant invention to provide a plastic extrusion process wherein plastic hollow tubing is extruded from a suitable hot forming zone in the form of a tube and into a suitable setting zone, wherein the inside of the tube is subjected to variations in fluid pressure at a region intermediate the zones in order to effect corresponding variations in the resulting tubing diameter of the set plastic material.

Other and further important objects of this invention will be apparent from the disclosures in the specification of preferred embodiment thereof, and the accompanying drawings.

On the drawings:

Figure 1 is an elevational view of a device employed in carrying out the invention showing parts diagrammatically and parts in section;

Figure 2 is a fragmentary sectional elevation showing one position of the cooperating parts of the device;

Figure 3 is an elevational fragmentary sectional view showing another position of the cooperating parts of the device; and Figure 4 is a fragmentary sectional elevation of the extruder nozzle employed in the device shown in Figure 1.

As shown on the drawings:

The reference numeral 10 designates generally an extruder nozzle, in Figures 1 and 4, which may be employed in a device embodying the invention. The extruder nozzle 10 is threadedly engaged to a conduit 11 leading from the screw conveyor chamber (not shown) wherefrom a suitable heat-fluidized plastic material is forced into the nozzle 10 and downwardly out through the downwardly directed mouth 12 of the nozzle 10.

The nozzle 10 consists of a die 13 having suitably mounted therein a core or mandrel 14 which cooperates with the die 13 to define an orifice at the downwardly directed mouth 12 of the die 13. The mandrel 14 is mounted in the die by means of a bridge 15, which has the general shape of a spider wherein the central portion shown herein is integrally formed with the mandrel 14 and the spider arms extend therefrom to the inside walls of the die 13 and are suitably fastened thereto. The mandrel 14 and bridge 15 have a generally streamlined design, and the outer surfaces thereof, like the inner surface of the die 13, are smoothly polished to permit even flow of the heat fluidized plastic thereby.

The particular design of the extruder nozzle 10 in many respects, may be altered to suit various needs, of course, according to well known principles of the extruding art. For example, it may be desirable to so design the die 13 and cooperating mandrel 14 so that a longer traveled path is afforded therebetween from the bridge 15 to the nozzle mouth 12, in order to completely avoid any irregularities in the extruded plastic tube which might be effected by the presence of the bridge arms. Also, various heating elements may be embodied in the nozzle 10 in a predetermined manner so as to maintain more complete control of the temperature of the plastic material being extruded therefrom.

On the other hand, it is preferred for the purposes of the instant invention that the extruder nozzle mouth 12 be downwardly directed, so that the plastic tubing extruded therefrom will move generally downwardly without any tendency to collapse or twist the tubing. The particular design of the instant die 13, which is designed similar to the general shape of a 90 degree pipe elbow is, accordingly, important insofar as the die 13 and the cooperating mandrel 14 therein bring about extrusion of a plastic tube defined by the orifice therebetween in a downward direction.

A fluid pressure line 16, adapted to be connected to a source of fluid pressure (not shown) such as a compressed air tank, affords a means for flowing fluid under pressure through the wall of the die 13, through one or more of the spider arms of the bridge 15, and then downwardly along the longitudinal axis of the mandrel 14 and out of the bottom thereof, in the manner shown in Figure 4. A valve 17 controls the flow of fluid through the line 16, and thereby controls the fluid pressure exerted at the bottom of the mandrel 14.

The mandrel 14 extends a substantial distance downwardly from the nozzle mouth 12. As is shown herein, the mandrel 14 expands uniformly in all directions so as to define a generally bell-shaped bottom extremity extending below the nozzle mouth 12. As shown, the mandrel 14 expands at an increasing rate so that the sides thereof, in cross section, define curves extending downwardly and outwardly. It will be appreciated, of course, that other mandrel designs may be used. However, the general design for the mandrel 14 calls for expansion of the mandrel 14 as it extends downwardly so as to define a bottom space which is wider in some portions at least than the width of the nozzle mouth 12, and which is centrally apertured to receive the fluid pressure line 16.

Suitably mounted on the bottom face of the mandrel 14 is a baffle plate 18, which has substantially the same shape and contour as the bottom face of the mandrel 14. The baffle plate 18 is preferably mounted by means of a plurality of legs extending downwardly from the bottom face of the mandrel 14 and the plate 18 is preferably spaced a relatively short distance from the bottom face of the mandrel 14.

It will be appreciated that the fluid flowing through the fluid pressure line 16 and out through the apertured bottom of the mandrel 14 impinges against the baffle plate 18 and is directed laterally in all directions along a plane defined generally by the baffle plate 18. Again, it will be understood that for certain special purposes the baffle plate 18 may be so designed that it directs fluid flow laterally in only certain predetermined directions instead of all directions, as shown herein. The principal function of the baffle plate is to direct a stream of pressurized fluid laterally, or transversely to the direction of travel of the extruding plastic tubing which passes over the mandrel 14 and downwardly past the baffle plate 18.

By the use of the expanding mandrel bottom portion, it is possible to decrease appreciably the thickness of the walls of the plastic tubing being extruded thereover. Assuming that the decrease in thickness of the walls is proportionately more weakening to the plastic film than the rigidifying effect of any decrease in temperature which may be effected in the plastic material extruding over the mandrel 14, the mandrel 14 may be so designed that suitably thin and weakened plastic tube walls are not presented to the force of a fluid blast until such walls pass by the space between the bottom of the mandrel 14 and the baffle plate 18. In other words, the plastic tubing sliding over the middle portion of the mandrel 14 is of sufficient strength to hold against the sides of the mandrel 14, but the tubing is so weakened by the additional expansion thereof effected at the bottom of the mandrel 14 that it may be further expanded by a blast of air exerted against the inside walls of the tubing in the region between the bottom of the mandrel 14 and baffle plate 18.

Directly below the baffle plate 18 are a pair of cooperating knives 19 which are suitably mounted on a vertically extending supporting member 20 shown herein as a cylindrical member positioned below the nozzle 10 and having a diameter substantially greater than the outside diameter of the nozzle 10. The vertical support 20 may be mounted on a suitable fixed horizontal support member 20a. As is shown diagrammatically, the knives 19 cooperate in a generally horizontal plane just below the baffle plate 18 and the knives 19 are each of substantial width so that when brought together as shown in Figure 2, they effectively pinch the entire width of the plastic tubing which would normally extend downwardly below the baffle 18.

As will be seen from Figure 2, the knives are so designed and positioned that they may be brought together so as to pinch the plastic tube, represented by the reference numeral 21 so that the forward portion 21a of the plastic tube is severed therefrom by the knives 19, and the forward end 21b of the remaining portion 21c of the tube extruding from the nozzle 10 may be fused together to form a closed forward end at 21b. As will be explained in detail hereinafter, the knives 19 thus have the dual function of severing the forward portion of the tube 21a and also of fusing the forward end 21b of the remaining portion 21c of the tube 21. In order to be assured of accomplishing fusion of the plastic tubing member at 21b, it may be advisable to employ heating means (not shown) as a part of or in conjunction with the knives 19.

As is shown in Figure 1, the cooperating action of the knives 19 may be effected by any one of various well known means, such as a spring 22 and solenoid 23 combination. The essence of the knife operation involves successive well timed knife movements so as to accomplish repeated severance of predetermined lengths of the forward end 21b of the extruding tubing.

Also, the movement of the knives 19 must be so timed that once the knives 19 have been brought together, they will remain together for a period of time sufficient to permit the fusion of the plastic tubing at the forward end 21b and also to permit the flowing of the plastic tubing material laterally, in response to the air pressure above the baffle plate 18, so as to ultimately define a generally flat disc shaped forward end 21b of the plastic tubing upon the top surfaces of the joint knife members 19. It will be appreciated that a master timing switch 24 may be suitably adjusted to accomplish the desired timing of the movement of the knife members 19.

After the knife members 19 have been drawn outwardly, the closed forward end 21b of the unsevered portion 21c of the tubing 21 starts to drop downwardly; and by means of suitable timing devices a piston member 25 presenting a top horizontally aligned face has been moved vertically upwardly into position just below the position of the knives 19. Accordingly, the forward end 21b of the tubing 21 drops downwardly upon the horizontal face of the piston 25, as is shown in Figure 3. The piston 25 may be actuated by suitable fluid pressure responsive means 26, which in turn are actuated in accordance with signals from the timing switch 24.

Suitably mounted upon the support member 20 and below the knives 19 is an apertured pipe ring 27 for delivering fluid flow against the outside of the tubing 21. It will be appreciated that designs or structures other than the instant pipe ring 27 may be employed for the purpose of delivering radially inwardly directed fluid flow against the plastic tube 21. As shown herein, the pipe ring contains a plurality of apertures 27a which direct fluid flow inwardly and generally horizontally. Fluid is supplied to the pipe ring 27 by means of a fluid pressure header 28 adapted to communicate with a source of fluid under pressure (not shown). The header may be joined with the fluid pressure line 16, for example, at the T-connection 29 so as to receive fluid under pressure from the same source, which may be a compressed air tank. The valve 30 in the header 28 may be used to control the flow of fluid therethrough from such source.

On the other hand, it may be desirable to employ a source of fluid under pressure other than the source supplying the line 16, for example, for the purpose of employing a fluid different from that employed in the line 16. In such an instance, the fluid may be supplied from a suitable source (not shown) such as water under pressure, through a second fluid pressure line 31, past the control valve 32 positioned therein. It will also be appreciated that each of the valves 17, 30 and 32 may be operated individually by means of electrical control and timing devices, for example, in order to effect the proper sequence in the operation thereof. Such timing and control devices are well known in the art and need not be discussed herein.

The instant apparatus is unique in that it provides for suitable operation of the extruding apparatus for a variety of different extrudable plastic materials. For example, the apparatus may be used in the extrusion of thermoplastic synthetic resins capable of rapid cooling as well as those which must be cooled relatively slowly. Also, thermosetting resins may be used.

In the operation of the instant apparatus employing thermoplastic materials which may be cooled quickly, such as the various elastomeric compounds, for example, polyvinyl choride, polyvinyl chloride-acetate, polyethylene, polyvinylidene chloride, and nylon, all of which may be led directly into a cold water tank and cooled abruptly therein before being led onto any sort of conveyor or other take-up equipment.

In the operation employing such materials, the particular material employed is head-fluidized and passed through the nozzle 10 in the customary manner well known to workers in the art of extruding plastic materials. The particular temperatures employed and various other extrusion operating conditions are well known to the workers in the art and need not be discussed herein. In the operation of the instant apparatus, the material is so treated that it extrudes past the nozzle mouh 12 downwardly over the mandrel 14 in head-fluidized, pliable condition. As the material passes over the bottom end of the mandrel 14, it is subjected to a laterally directed internal blast of air flowing off the baffle plate 18. The blast of air so directed is controlled so as to effect a predetermined expansion of heat-fluidized plastic tube at this point. The extent of the expansion may, of course, also be controlled to a limited extent by controlling the temperature of the air itself.

In the manufacture of plastic closures having the general shape of the incompletely formed bottle designated generally by the reference numeral 33 in Figure 1, the control valve 17 is set so as to deliver maximum air pressure at the baffle plate 18 during the formation of the body portion 33a of the bottle 33. During the time that that portion of the plastic tubing which ultimately defines the body portion 33a is passing over the mandrel 14, the control valve 17 permits maximum air flow therethrough so as to effect controlled expansion of the plastic tube in the region of the baffle plate 18 and the bottom of the mandrel 14. After the predetermined length of tubing necessary to form the body portion 33a has passed over the mandrel 14 and beyond the baffle 18, the control valve 17 is closed completely or partially so as to reduce the pressure of air exerted at the baffle plate and thereby to reduce the extent to which the tubing is expanded so that a neck portion 33b of the bottle 33 may be formed. It will be appreciated, of course, that immediately after the air pressure at the baffle plate 18 has effected the desired expansion of the heat fluidized plastic tube material that expanded portion passes into alignment wtih the pipe ring 27.

In the case of plastic materials hereinbefore mentioned which may be cooled rapidly, for example, by the use of water, a plurality of streams of water are directed through the apertures 27a in the pipe ring 27 against the outside of the tube walls aligned therewith. For such purposes, the line 31 is connected with a source of water under pressure, the valve 30 is closed and the valve 32 is employed as a control valve. It will also be appreciated that additional cooling means may be provided in the form of a plurality of pipe rings, or in the form of a water bath having the top level thereof at approximately the height of the pipe ring 27.

The fluid passing through the apertures 27a in the pipe ring 27 may be employed solely for the purposes of cooling the plastic tubing in order to effect setting thereof so that the plastic tubing which has passed beyond the pipe ring 27 will be so set and stabilized in its dimensions that the air pressure in the interior of the tubing will have little or no effect thereupon. Also, the fluid may be forced through the apertures 27a in the pipe ring 27 with such pressure that pressure is actually exerted against the side walls of the tubing 27 so as to effect contraction of the tubing diameter, such as at the neck portion 33b of the bottle 33.

The general tendency of the extruding plastic tubing is that of creating an increased volume in the closed body portion 33a, so that a substantial decrease in the pressure exerted against the tubing during formation of the neck portion 33b may be effected merely by cutting off the air flowing through the valve 17. It may also be necessary to exert still a greater force against the outside of the tubing by means of fluid pressure at the pipe ring 27.

After the extruding tubing has traveled the predetermined distance necessary to form the neck portion 33b under the pressure conditions hereinbefore described, the master timing switch 24 actuates the knives 19, so as to bring them together in the position shown in Figure 2. At the time the knives are brought together, the position of the piston 25 is approximately that shown in Figure 1 and immediately thereafter, the piston 25 drops rapidly to the position 25' shown in dotted line and the severed bottle 33' (also shown in dotted line) is removed from the top surface 25' of the piston by any suitable means (not shown) such as an air blast. The piston is then immediately returned to approximately the position shown in Figure 3.

In the meantime, the knives 19 have, first, severed the tubing so as to permit the bottle 33 to drop down with the piston 25 as shown in Figure 1 and, then, the knives have maintained the closed position shown in Figure 2 in order to effect fusion of the plastic tubing at 21b and in order to support the plastic tubing while fusion takes place until the piston member 25 may return to the position shown in Figure 3. Then, the knives 19 open and the fused forward end 21b of the remaining plastic tubing settles upon the top face of the piston 25. In order to effect suitable fusion of the forward end 21b of the plastic tube 21 it may be necessary to heat the knives 19 and possibly the top face of the piston 25. Such heating may be accomplished by various heating means well known to those skilled in the art. Also, it is preferable to reduce as much as possible the air pressure exerted at the baffle plates 18 during the moments just prior to and during which fusion is effected to accomplish closing of the forward ends of 21b.

As soon as the fused forward end 21b of the tube 21 has settled upon the top face of the piston 25, the air blast at the baffle 18 may be increased appreciably so as to expand the two walls to the size desired for the body portion 33a of the bottle 33, and as soon as the expansion to that extent has been completed, the piston 25, which may have the top face thereof roughened so as to increase the adherence of the plastic tubing material thereto, is lowered slowly past the pipe ring 27, at which point fluid cooling means may be caused to impinge upon the outer surfaces of the plastic tubing with insufficient force to effect distortion thereof, so as to set the plastic material.

The piston member 25 then continues to move downwardly slowly until the entire body portion 33a of the bottle 33 has been formed, whereupon the air pressure at the baffle plate 18 is decreased appreciably or cut off completely, and if necessary, the fluid pressure at the pipe ring 27 is increased, thereby completing the cycle.

Such thermoplastic synthetic resins as the rigid polyvinyl compounds, cellulose acetate, cellulose acetate-butyrate, and polystyrene ordinarily cannot be cooled quickly as, for example, by quenching in cold water. In the use of such compounds in the instant apparatus the cycle is substantially the same as that hereinbefore described. However, instead of employing a water bath at approximately the level of the pipe ring 27 or of employing water as a cooling fluid being ejected from the apertures 27a of the pipe ring 27, it is necessary to use air, for example, as a cooling fluid at the region of the pipe ring 27. In such cases, also it is usually desirable to employ a plurality of pipe rings, each designed much in the same manner as the pipe ring 27 is designed so that the travel on the extruding expanded tube past the fluid cooling means will be more prolonged, and the pressure exerted by means of the cooling fluid flow against the outside walls of the tube may be controlled so that the tendency of such slow cooling materials to undergo appreciable deformation past the baffle plate 18 may be successfully resisted by the exertion of suitable fluid pressure forces against the outside walls thereof, while cooling is taking place.

Extrusion of certain thermosetting materials, such as the phenol-formaldehyde synthetic resins, has also been carried out. The basic characteristic of such resins is that of first softening in response to the initial application of heat and then hardening to an infusible state under the continued application of heat. In the use of such materials, it is necessary to time very accurately the various processing steps in order to accomplish conversion to the infusible stage at the proper point in the instant process.

As will be appreciated, the instant process provides for setting or hardening of the thermoplastic resins at approximately the area of the pipe ring 27. In the use of thermosetting materials such as phenol-formaldehyde resins, the process must be timed so as to accomplish conversion to the infusible state at approximately the same region. Accordingly, the thermosetting plastic material is extruded from the nozzle 10 in substantially the same manner hereinbefore described for the other plastic materials; but the rate at which the thermosetting material has been heated during passage through the screw conveyor and the nozzle 10 is so controlled that conversion to the infusible stage is timed so as to take place in the plastic material at approximately the time that the plastic material becomes aligned with the pipe ring 27 in the course of its downward travel. In addition, the fluid forced from the apertures 27a of the pipe ring 27 may in such cases be a hot fluid, so as to effectively increase the rate or actually bring about the setting of the material in that region. For example, the fluid directed against the outside walls of the tubing adjacent the pipe ring 27 may be steam.

It will be understood that modifications and variations may be effected without departing from the scope of the novel concept of the instant invention.

I claim as my invention:

1. In a plastic extrusion process wherein plastic tubing is extruded from a suitable hot forming zone into a suitable setting zone, the step of subjecting the inside of the tubing, at a given point intermediate said zones, to alternately strong and weak laterally directed blasts of air of thrust force sufficient to effect correspondingly alternate variations in the diameter of the tube from large diameter to substantially smaller diameter sections, respectively, just prior to setting of the plastic.

2. In a plastic extrusion process wherein plastic tubing is extruded from a suitable hot forming zone into a suitable setting zone, the improvement of subjecting the inside of the traveling extruded tube, at a given point intermediate said zones, to a fluid blast directed against the interior wall with sufficient thrust force to expand the tube as it travels past said given point, while maintaining a fluid pressure differential across the tube walls before and after said given point that is insufficient to cause tube expansion.

References Cited in the file of this patent

UNITED STATES PATENTS

| | | |
|---|---|---|
| 1,981,636 | Soubier | Nov. 20, 1934 |
| 2,175,053 | Ferngren | Oct. 3, 1939 |
| 2,187,432 | Powers | Jan. 16, 1940 |
| 2,331,688 | Hobson | Oct. 12, 1943 |
| 2,349,177 | Kopitke | May 16, 1944 |
| 2,349,178 | Kopitke | May 16, 1944 |
| 2,433,937 | Tornberg | Jan. 6, 1948 |
| 2,461,630 | Cozzo | Feb. 15, 1949 |
| 2,461,975 | Fuller | Feb. 15, 1949 |
| 2,668,323 | Johnson | Feb. 9, 1954 |